R. G. EWING.
CONTINUOUS GLASS DRAWING APPARATUS.
APPLICATION FILED APR. 9, 1917.

1,240,185.

Patented Sept. 18, 1917.
2 SHEETS—SHEET 1.

Inventor,
Robert G. Ewing
by Robt. B. Wilson
Attorney

R. G. EWING.
CONTINUOUS GLASS DRAWING APPARATUS.
APPLICATION FILED APR. 9, 1917.

1,240,185.

Patented Sept. 18, 1917.
2 SHEETS—SHEET 2.

UNITED STATES PATENT OFFICE.

ROBERT G. EWING, OF TOLEDO, OHIO.

CONTINUOUS GLASS-DRAWING APPARATUS.

1,240,185.  Specification of Letters Patent.  Patented Sept. 18, 1917.

Application filed April 9, 1917. Serial No. 160,605.

*To all whom it may concern:*

Be it known that I, ROBERT G. EWING, a subject of Great Britain, residing at Toledo, in the county of Lucas and State of Ohio, have invented new and useful Improvements in Continuous Glass-Drawing Apparatus, of which the following is a specification.

My invention relates to improvements in continuous glass drawing apparatus.

In the molten glass supply for continuous sheet glass drawing now used, the molten glass is drawn from the same part or "working chamber" of a stationary supply tank, and it is found in practice in the drawing of good commercial window glass, that the molten glass mass in the working chamber cannot be maintained continuously in proper working condition, that the mass of glass below the place from which the glass is drawn, by reason of gradually lowering temperature, and the precipitation of heavy sediment, gradually becomes less and less plastic, and hardens from the bottom upward until it interferes with and finally prevents drawing of the mass into a continuous good commercial sheet and makes a "shut down" necessary for the purpose of removing the accumulation.

The object of my invention is to prevent the reduction of temperature and plasticity, the accumulative precipitation of sediment, and of a hardened mass below the place of drawing, and thereby make it possible for continuous drawing of good commercial window glass for practically long periods of time without stoppage.

A further object is to segregate at the place of drawing a relatively motionless supply of molten glass in a suitable condition for drawing, from the remainder of the supply, a part of which is moving to a place of re-heating from the place of drawing and a part is moving from the place of re-heating to the place of drawing, whereby a continuous supply of glass to the place of drawing in condition for drawing is provided, and a portion of the glass beneath the place of drawing is carried therefrom to the place of re-heating.

I accomplish these objects by the construction and combination of parts as hereinafter described, set forth in the claims and illustrated in the drawings, in which—

Figure 1:
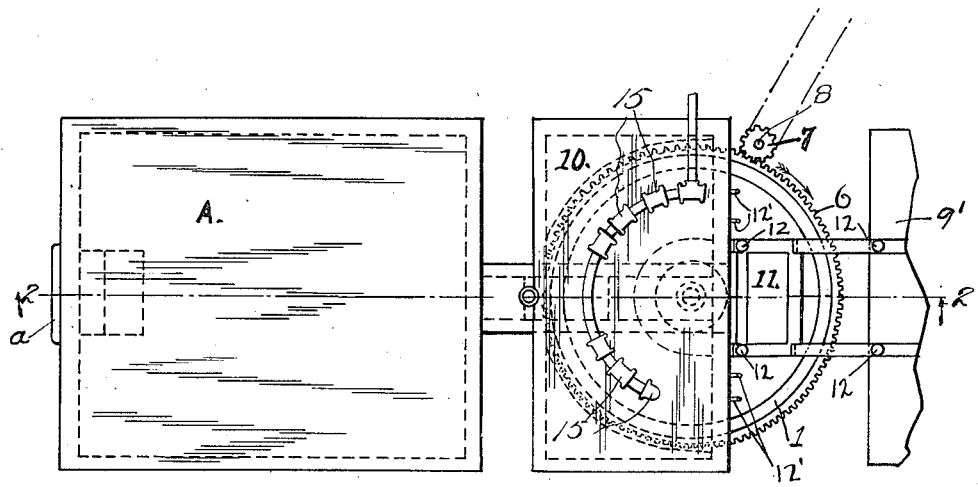
Figure 1 is a plan view of a glass supply constructed in accordance with my invention.

In the drawing A designates a glass melting furnace of suitable capacity, having a feed door $a$ at one end to receive the materials as required to maintain a continuous supply of molten glass $b$, a discharge spout $c$ at the opposite end, a gas supply $d$ for heating the furnace and a separating bridge wall $e$ between the spout $c$ and the feed door $a$, and forming a refining chamber $f$, into which the wall admits only molten glass free from the lighter impurities, and which permits only the surface portion, out of which the heavier impurities have been precipitated, to flow through the discharge spout $c$.

To receive the glass discharged from the spout $c$ is provided a revoluble cylindrical tank 1 of suitable capacity relative to the furnace A.

The tank 1 is supported on an axial post 2, journaled in a suitable bearing 3 at its lower end, and by a series of rollers 4 around the periphery of the bottom of the tank 1, engaging a circular track 5. Around the lower portion of the wall of the tank 1 is provided a toothed band 6, intermeshing with which is a pinion 7, mounted on a driving shaft 8, connected to a driving power, (not shown) whereby the tank is revolved slowly, preferably in the direction indicated by an arrow in Fig. 1.

The tank 1 extends under the spout $c$ adjacent to the refining chamber $f$ of the furnace A, and is of a depth and diameter to contain a drawing supply suitable to the capacity of the furnace A.

Figure 4:
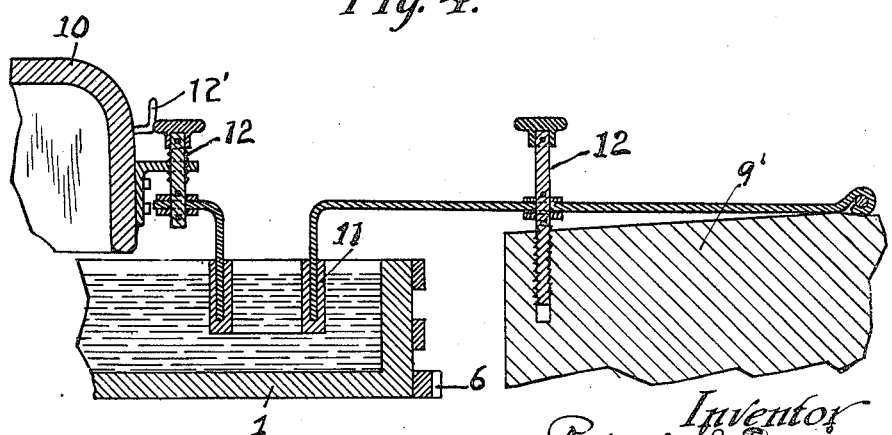
Fig. 4 is a vertical section on line 4—4 of Fig. 3 of an enlarged broken away portion of the same and showing means of adjusting the depth of submersion of the stationary drawing well.

On walls 9, around the tank 1, is supported a hood or cover 10 for the tank, which covers all but a segment of the top of the tank (as shown in Fig. 1) and in this open segment, is supported by the hood and the stationary wall 9' about the tank, a drawing well 11, which is open at the top and bottom. The walls of the well 11 are submerged in the molten glass of the tank to near the top of the well. Preferably the well 11 is adjustably mounted by screws 12, as shown in Fig. 4, to control the depth of submergence of its walls in the molten glass.

Figure 5:
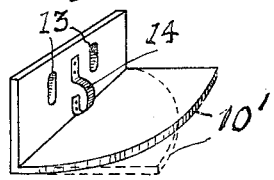
Fig. 5 is a view in perspective of an attachable and detachable extension of the hood of the drawing tank.

Preferably the hood 10 is provided with two detachable extensions 10' (made in reverse form, as shown in dotted lines in Fig. 5), which may be used to cover in the open spaces between the ends of the well 11 and the wall of the tank 1. The hood 10 is provided with a pair of hooks 12' opposite each open space between each end of the well 11, and the wall of the tank and each extension 10' is provided with a pair of slots 13 by which the extensions are hung on the hooks and each with a handle 14 for attaching and detaching it.

The space within the well 11 is left open.

The inner portion of the hood 10 is provided with gas burners 15 adapted to reheat the portion of the glass in the tank, beneath the hood, as required.

Figure 2:
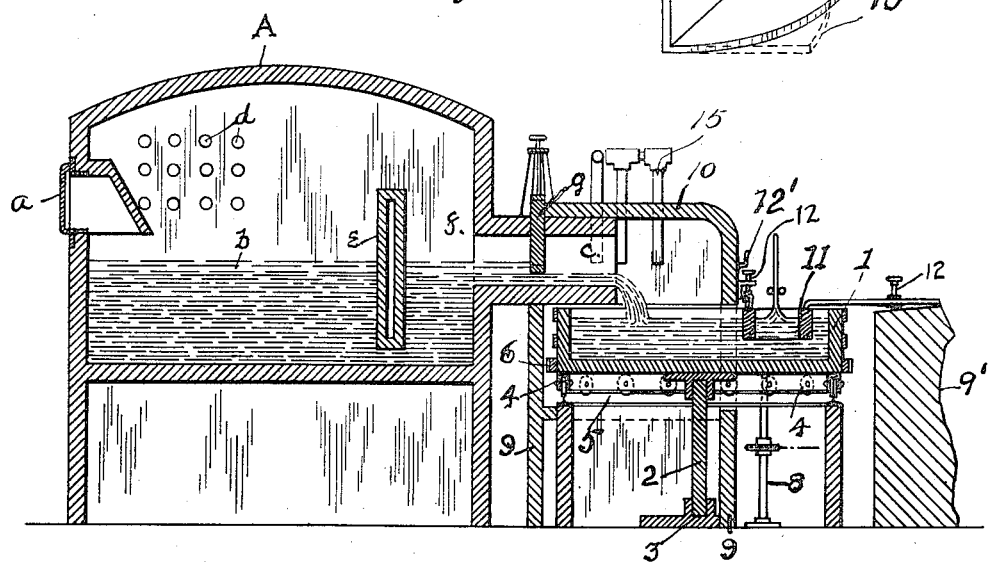
Fig. 2 is a transverse longitudinal section of the same on line 2—2 of Fig. 1.
Figure 3:
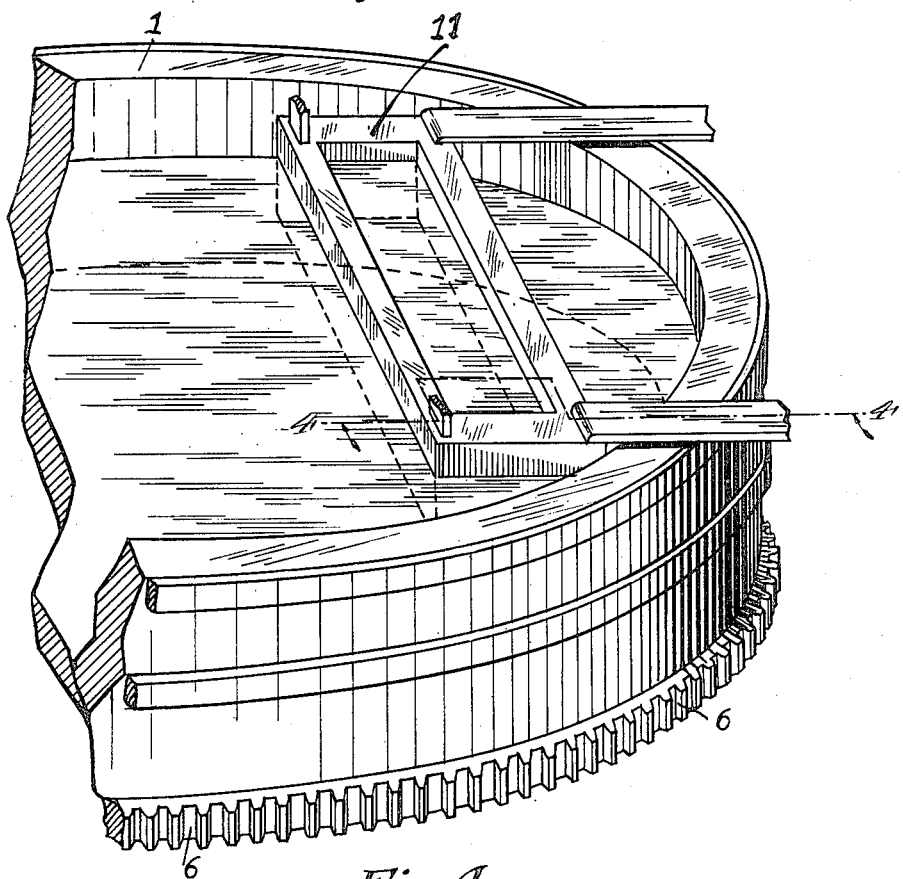
Fig. 3 is a broken away perspective view of the auxiliary drawing tank.

Above the well 11 is provided means (not shown) suitable for drawing a bait upward from the well and therewith a sheet of glass, as indicated in Fig. 2, and thence continuously through a leer, (not shown).

The spout c is preferably provided with a gate valve g by which the depth of flow of molten glass through the spout from the furnace A to the tank 1 is regulated and controlled.

Thus constructed, while the drawing of a sheet of glass from the well is progressing, the tank 1 is slowly revolved by the driving shaft 8 in the direction shown by the arrow in Fig. 1, whereby the mass of molten glass in the tank is brought to the end of the well nearest the arrow, from the re-heating chamber of the hood, and past, around and under the well 11, and is moved from the opposite end portion back under the re-heating chamber of the hood. The molten glass within the walls of the well is relatively motionless as to the moving mass outside of it, except that the glass drawn from the surface of the well by drawing the sheet is supplied through the open bottom of the well, and it will be seen that the glass beneath the bottom of the well is constantly changing and moving back under the heated chamber of the hood, while the glass under the hood is constantly moving forward toward the well, whereby the gradually lowering temperature, and the gradual accumulation by precipitation producing a growing accumulation of hardened material immediately below the place of drawing, that occurs in stationary drawing tanks, is wholly prevented, and the glass in the well is maintained in a uniform drawing condition and quality.

The temperature of the glass supply at the drawing well 11 may be further controlled by the attachment or detachment of either or both the hood extensions 10'

What I claim to be new is—

1. In a continuous glass drawing apparatus, the combination with a continuous glass melting and supply furnace, of a revoluble drawing supply tank adapted to continuously receive molten glass from the melting furnace, a stationary hood covering in and forming a heating chamber over all the top of the revoluble tank excepting an open drawing segment of the top, means to revolve the tank and with it the mass of molten glass therein, means to segregate from the moving molten glass in the uncovered segment of the tank and maintain and hold relatively motionless therein, a drawing supply of the mass, means to continuously draw glass from the segregated portion of the glass, and means to re-heat the moving portion of the glass in the tank as it passes underneath the hood, whereby the segregated stationary drawing supply is maintained in a drawing condition, and the accumulation of detrimental deposit below the place of drawing is prevented.

2. In a continuous glass drawing apparatus, the combination with a continuous glass melting and supply furnace, of a revoluble drawing supply tank adapted to continuously receive refined molten glass from the melting furnace, a stationary hood covering in and forming a re-heating chamber over all the top portion of the revoluble tank excepting an open drawing segment of the top, a drawing well, open at the top and bottom and fixedly supported with its walls partly submerged in the mass of glass in the revoluble tank within its uncovered segment, means to continuously draw glass from the well, means within the hood to reheat the glass in the tank, and means to slowly revolve the revoluble supply tank, whereby a drawing supply of glass is held stationary in the open segment of the supply tank in a mass of molten glass moving from and to the place of re-heating, and adapted to maintain the drawing supply in condition for continuous drawing.

3. In a continuous glass drawing apparatus, the combination of a drawing supply tank adapted to be continuously supplied with molten glass, a hood partly covering in and inclosing the supply tank, forming a re-heating chamber therefor, and having an open drawing portion, a stationary drawing well open at top and bottom and partly submerged in the supply of molten glass in the open drawing portion of the tank and adapted to segregate the portion of the glass in the drawing well from the molten glass in the tank, means to move the mass of molten glass of the tank, excepting the portion in the well, from and to the heating chamber, and to and around and under and from the drawing well, means to supply heat to the heating chamber, and means to continuously draw glass from the well.

4. In a continuous glass drawing apparatus, the combination with a glass melting supply furnace, of a drawing supply tank adapted to continuously receive molten glass from the melting furnace, a stationary hood covering in the larger portion of the supply tank excepting an open drawing portion of the top, and forming a re-heating chamber for the glass in the tank, means to segregate a drawing supply from the molten glass in the tank in the uncovered portion of the tank, and hold it relatively motionless therein, means to continuously draw glass from the motionless segregated portion of the glass, means to supply heat to the re-heating chamber, and means whereby the glass in the tank is moved from and to the re-heating chamber, to and from and around and under the segregated drawing supply, and whereby the segregated drawing supply is maintained in drawing condition, and an accumulation of detrimental deposits below the place of drawing is prevented.

5. In a continuous glass drawing apparatus, the combination of a revoluble drawing supply tank adapted to be continuously supplied with molten glass, a hood partly covering in and inclosing the supply tank and forming therewith a re-heating chamber above and for the glass in the tank and leaving a drawing portion of the top open, a drawing well, open at its top and bottom, and having its walls partly submerged in the molten glass in the tank, means to revolve the tank, means to heat the chamber over the tank, and means to continuously draw glass from the well.

6. In a continuous glass drawing apparatus, the combination of a revoluble drawing supply tank adapted to be continuously supplied with molten glass, a hood partly covering in and inclosing the supply tank and forming therewith a re-heating chamber above and for the glass in the tank and leaving a drawing portion of the top open, means to segregate a drawing supply from the molten glass in the tank in the uncovered portion of the tank, and hold it relatively motionless therein, means to continuously draw glass from the segregated portion of the glass, means to supply heat to the re-heating chamber, and means whereby the glass in the tank is moved from and to the re-heating chamber, to and around and under and from the segregated drawing supply.

In testimony whereof I have hereunto set my hand at Toledo, Ohio, this 5th day of April, 1917.

ROBERT G. EWING.

In presence of—
   ALBERT T. GOORLEY,
   G. WM. BAUMGARTNER.